United States Patent
Kurlovich

(12) 
(10) Patent No.: US 6,526,262 B1
(45) Date of Patent: Feb. 25, 2003

(54) PHASE-LOCKED TRACKING FILTERS FOR CELLULAR TRANSMIT PATHS

(75) Inventor: Anthony N. Kurlovich, Carlsbad, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/314,612

(22) Filed: May 19, 1999

(51) Int. Cl.⁷ .................................................. H04B 1/40
(52) U.S. Cl. ..................... 455/75; 455/76; 455/108; 455/112; 455/260; 375/294; 375/297; 375/298
(58) Field of Search ........................... 455/75, 76, 108, 455/112, 113, 118, 119, 260; 375/294, 327, 297, 298

(56) References Cited

U.S. PATENT DOCUMENTS

| | | | |
|---|---|---|---|
| 4,965,533 A | | 10/1990 | Gilmore |
| 5,175,729 A | * | 12/1992 | Borras et al. ................ 370/345 |
| 5,313,173 A | | 5/1994 | Lampe |
| 5,740,521 A | * | 4/1998 | Hulkko et al. ................ 455/76 |
| 5,794,131 A | * | 8/1998 | Cairns .......................... 455/76 |
| 5,825,254 A | * | 10/1998 | Lee ............................... 331/25 |
| 5,828,955 A | * | 10/1998 | Lipowski et al. ........... 455/324 |
| 5,835,850 A | * | 11/1998 | Kumar ....................... 455/67.4 |
| 5,894,592 A | * | 4/1999 | Brueske et al. ............... 455/86 |
| 5,983,081 A | * | 11/1999 | Lehtinen ...................... 455/76 |
| 5,991,605 A | * | 11/1999 | Rapeli ........................... 455/76 |
| 6,208,875 B1 | * | 3/2001 | Damgaard et al. .......... 455/552 |

* cited by examiner

Primary Examiner—Lester G. Kincaid
Assistant Examiner—Temica M. Davis
(74) Attorney, Agent, or Firm—Blakely, Sokoloff, Taylor & Zafman LLP

(57) ABSTRACT

Methods and apparatus for bandpass filtering a radio frequency (RF) signal in a cellular transmit path to provide a filtered RF signal to a power amplifier. The methods comprise bandpass filtering the RF signal by tracking, without translating, the carrier frequency of the RF signal with a phase-locked loop prior to power amplifying the signal for transmission. The tracking filter provides symmetrical filtering by centering the pass band of the tracking filter on the RF carrier, irrespective of where the RF carrier is within the pass band of the system.

14 Claims, 3 Drawing Sheets

PHASE-LOCKED TRACKING FILTERS FOR CELLULAR TRANSMIT PATHS

BACKGROUND OF THE INVENTION

1. Field of the Invention

The present invention relates generally to bandpass filters for cellular radio transmitters. More particularly, it relates to bandpass filtering for reducing phase noise and spurious noise.

2. Description of Related Art

The Global System for Mobile Communications (GSM), originally known as Groupe Spèciale Mobile, was developed as a standard for cellular communication in Europe. GSM offers a wide range of functionality in the transmission of voice and data. It has been adopted throughout Europe and the rest of the world. The original primary GSM has been expanded to encompass other versions for wider total bandwidths, such as extended GSM, DCS 1800 and PCS 1900.

GSM is a purely digital system. The primary GSM system uses the 900 MHz band, of which 890–915 MHz is for mobile transmissions, and 935–960 MHz is for the base transmissions. There are 124 channels (174 channels for extended GSM, 374 channels for DCS 1800 or PCS 1900), with each channel being 200 kHz wide. In GSM, TDMA (time division multiplexing access) is used, with 8 time slots per channel, numbered 0 to 7. GSM uses wide channels to allow high speed digital transmission, resulting in reduced effects of fading and minimizing production costs. Gaussian Minimum Shift Keying (GMSK) is used as the modulation process.

In a typical communication system using GSM, there are a number of processing stages involving modulation and filtering. Modulation converts intermediate frequency (IF) signals to radio frequency (RF) signals. Filtering, including bandpass filtering, eliminates the unwanted frequency components such as various forms of noise. In general, at a cellular radio transmitter, an information bit sequence is coded and transformed into an analog waveform centered at baseband frequency, which is subsequently up-converted to be centered at a higher frequency in order to be transmitted over one of a number of predetermined radio frequency (RF) channels.

Up-conversion techniques usually produce a signal with higher phase noise and spurious noise than is acceptable. Thus, bandpass filtering is needed to suppress these noise components before the signal is power-amplified for transmission. In a typical prior art system, a bandpass filter, usually a conventional surface acoustic wave (SAW) bandpass filter, is used to filter out the phase noise and spurious noise in the RF signal. Due to the fixed, wide bandwidth of the filter, if the center frequency of a signal is near one of the two edges of the filter's pass band, the bandpass filter will not provide the same attenuation in the two sidebands of the signal. As a result, the attenuation will not be symmetrical about the center frequency of the bandpass filter. This unequal attenuation causes unwanted sidebands in the signal spectrum and in turn causes the carrier envelope of the filtered output signal to be non-constant. It is well known that, if the carrier envelope is non-constant, there will be sidelobe regrowth after the signal is amplified for transmission by the power amplifier. This is due to the non-linearities of the power amplifier. In order to reduce these regrown sidelobes, more filtering is needed after the power amplification. The additional filtering is typically performed by additional components such as a bandpass duplexer. This bandpass duplexer results in further power loss and increases the system cost.

Accordingly, there is a need for a bandpass filter which: (1) is more effective in a cellular transmit path than a conventional bandpass filter, (2) does not affect the approximately constant carrier envelope of the input signal, and (3) is cost effective.

SUMMARY OF THE INVENTION

The present invention comprises methods and apparatus for bandpass filtering a radio frequency (RF) signal in a cellular transmit path to provide a filtered RF signal to a power amplifier. The methods comprise bandpass filtering the RF signal by tracking, without translating, the carrier frequency of the RF signal with a phase-locked loop prior to power amplifying the signal for transmission. The tracking filter provides symmetrical filtering by centering the pass band of the tracking filter on the RF carrier, irrespective of where the RF carrier is within the pass band of the system.

DESCRIPTION OF A PREFERRED EMBODIMENT

In the following description, for purposes of explanation, numerous details are set forth in order to provide a thorough understanding of the present invention. However, it will be apparent to one skilled in the art that these specific details are not required in order to practice the present invention.

The present invention is a method and an apparatus for bandpass filtering a radio frequency (RF) signal to reduce phase noise and spurious noise without affecting the approximately constant carrier envelope. The spectrum of the filtered RF signal has symmetrically attenuated sidelobes in the two stopbands surrounding the passband. Although the bandpass filter of the present invention can be used in any transmit path system, an exemplary embodiment will be described in the following discussion as applied to a system which follows the standard of Global System for Mobile Communications (GSM).

Figure 1:
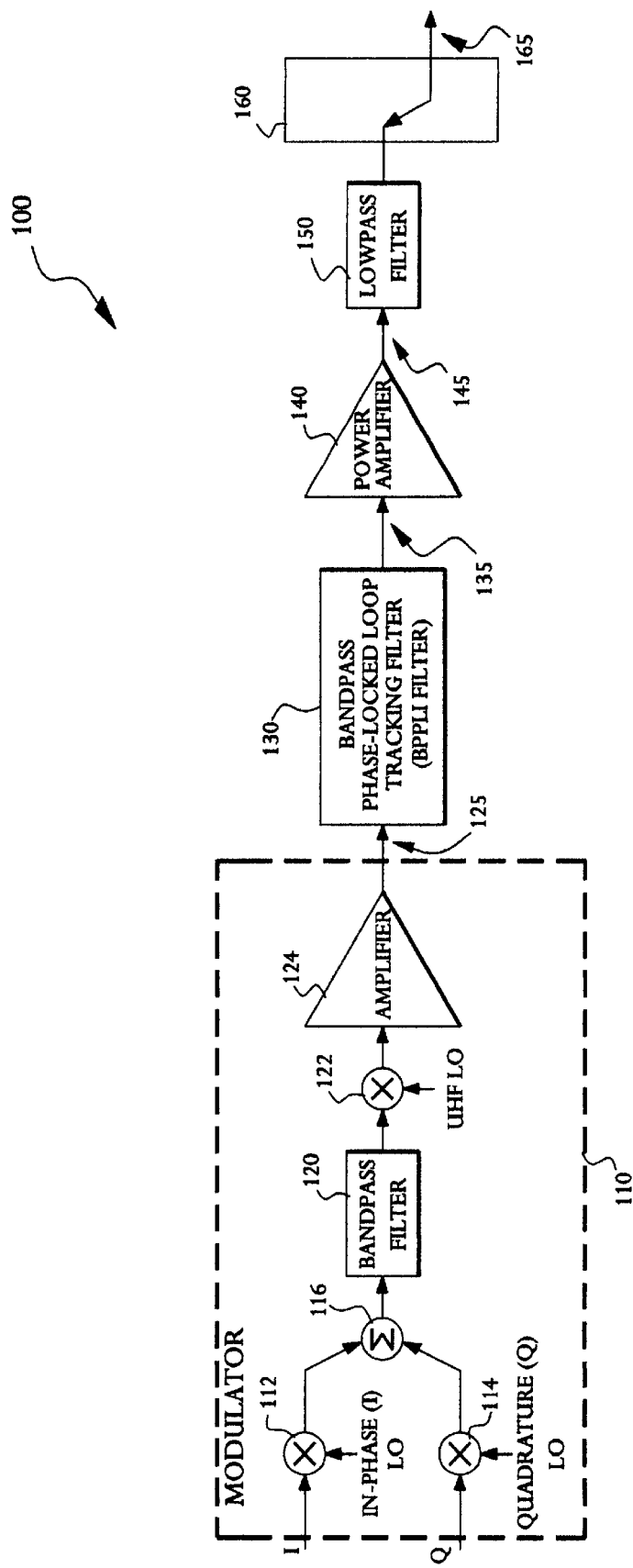
FIG. 1 is a block diagram of a transmit path such as in a GSM transmit system according to a preferred embodiment of the present invention.

FIG. 1 is a diagram of a system 100 as applied to a GSM system according to a preferred embodiment of the present invention. The system 100 includes a modulator 110, a bandpass phase-locked loop (BPPLL) tracking filter 130, a limiting power amplifier (PA) 140, a lowpass filter 150 and a switch 160.

The modulator 110 receives the in-phase and quadrature baseband digital signals to be modulated and transmitted, in-phase (I) and quadrature (Q) components of an intermediate frequency (IF) from a local oscillator and a UHF frequency from another local oscillator, and generates a modulated radio frequency (RF) signal coupled to the BPPLL tracking filter 130. The modulator 110 includes mixers 112 and 114, a combiner 116, a bandpass filter 120, an ultra high frequency (UHF) mixer 122 and an amplifier 124. The mixers 112 and 114 modulate the I and Q local oscillator (LO) signals with the I and Q signal components, respectively. The I and Q LO signals are orthogonal to each other, i.e., they differ in phase by 90 degrees. The combiner 116 combines the resulting modulated signals to produce a composite IF signal. The bandpass filter 120 filters the composite IF signal to eliminate undesired signal components outside a passband centered around the IF local oscillator frequency. In a preferred embodiment, the center frequency is 116 MHz. The UHF mixer 122 mixes the filtered IF signal with an UHF LO local oscillator signal having a center frequency within the appropriate frequency range, in a preferred embodiment for GSM mobile transmissions, a frequency range from 1006 MHz to 1031 MHz. The UHF mixer 122 effectively translates (up-converts) the filtered IF signal to the desired radio frequency for transmission, the difference frequency between the UHF frequency range of 1006 MHz to 1031 MHz and the IF frequency of 116 MHz being the desired transmit frequency range of 890 to 915 MHz. The amplifier 124 then amplifies the output of the UHF mixer 122 with an appropriate power gain, in a preferred embodiment, 15 dB. The modulator 110 provides an RF signal 125 having an effective passband, in a preferred embodiment, −140 dBc per Hz for frequencies equal to or higher than 935 MHz, 0 dBc at 915 MHz, and −140 dBc per Hz for frequencies equal to or lower than 895 MHz, where dBc denotes the absolute power in decibels relative to the carrier power. This essentially eliminates the sum frequency components created by the up-conversion, namely 1006 MHz to 1031 MHz plus 116 MHz., or 1122 to 1147 MHz. However, because of the up-conversion by the UHF mixer 122 and the amplification by the amplifier 124, the RF signal 125 will have higher phase noise and spurious noise than desired.

The BPPLL tracking filter 130 filters out the phase noise and spurious noise in the RF signal by tracking, without translating, the carrier frequency of the RF signal 125 to generate a filtered RF signal 135. The BPPLL tracking filter 130 includes a phase-locked loop 320 (shown in FIG. 3) having a very narrow bandwidth. For example, the bandwidth of the phase-locked loop 320 is about 200 kHz for GSM. This loop bandwidth will be referred to hereinafter as the intrinsic bandwidth of the BPPLL tracking filter 130.

Referring to FIG. 1 again, in the exemplary embodiment, the power amplifier 140 amplifies the filtered output signal 135 by 29 dB so that the power of the amplifier output signal 145 in its desired band is 34 dBm. The power of signal 135 is attenuated to −165 dBc per Hz for frequencies equal to or higher than 935 MHz, to 0 dBc around 915 MHz, and to −165 dBc per Hz for frequencies equal to or lower than 895 MHz. The power amplifier 140 is typically a class-C limiting power amplifier. Since the carrier envelope of the filtered output signal 135 is approximately constant, the carrier envelope of the amplifier output signal 145 is also approximately constant and there is little or no regrowth of the sidelobes in the stopbands of the signal 145 spectrum. Since there is little or no regrowth of the sidelobes, no bandpass filtering is needed after the power amplification.

The lowpass filter 150 filters out harmonic components in the signal above 915 MHz to produce a signal 165 for transmission. This filtering causes a small signal power loss of about 0.5 dB to 1 dB. The power of the transmitted signal 165 is 33 dBm in the desired band, −165 dBc per Hz for frequencies equal to or higher than 935 MHz, 0 dBc around 915 MHz, and −165 dBc per Hz for frequencies equal to or lower than 895 MHz. Switch 160 is used for transmitting the signal 165. Since there is less power loss due to the lowpass filter 150 than in prior art systems, the power amplifier 140 need not consume as much power as the corresponding amplifier in the prior art system. The lowpass filter 150 and the switch 160 are small and inexpensive, resulting in a lower cost for the system 100. The BPPLL tracking filter 130, which is a phase-locked tracking filter, may be implemented on a single integrated circuit with some external components, or may be implemented with a hybrid voltage-controlled oscillator (VCO). This will further reduce the cost of the system 100.

Figure 2:
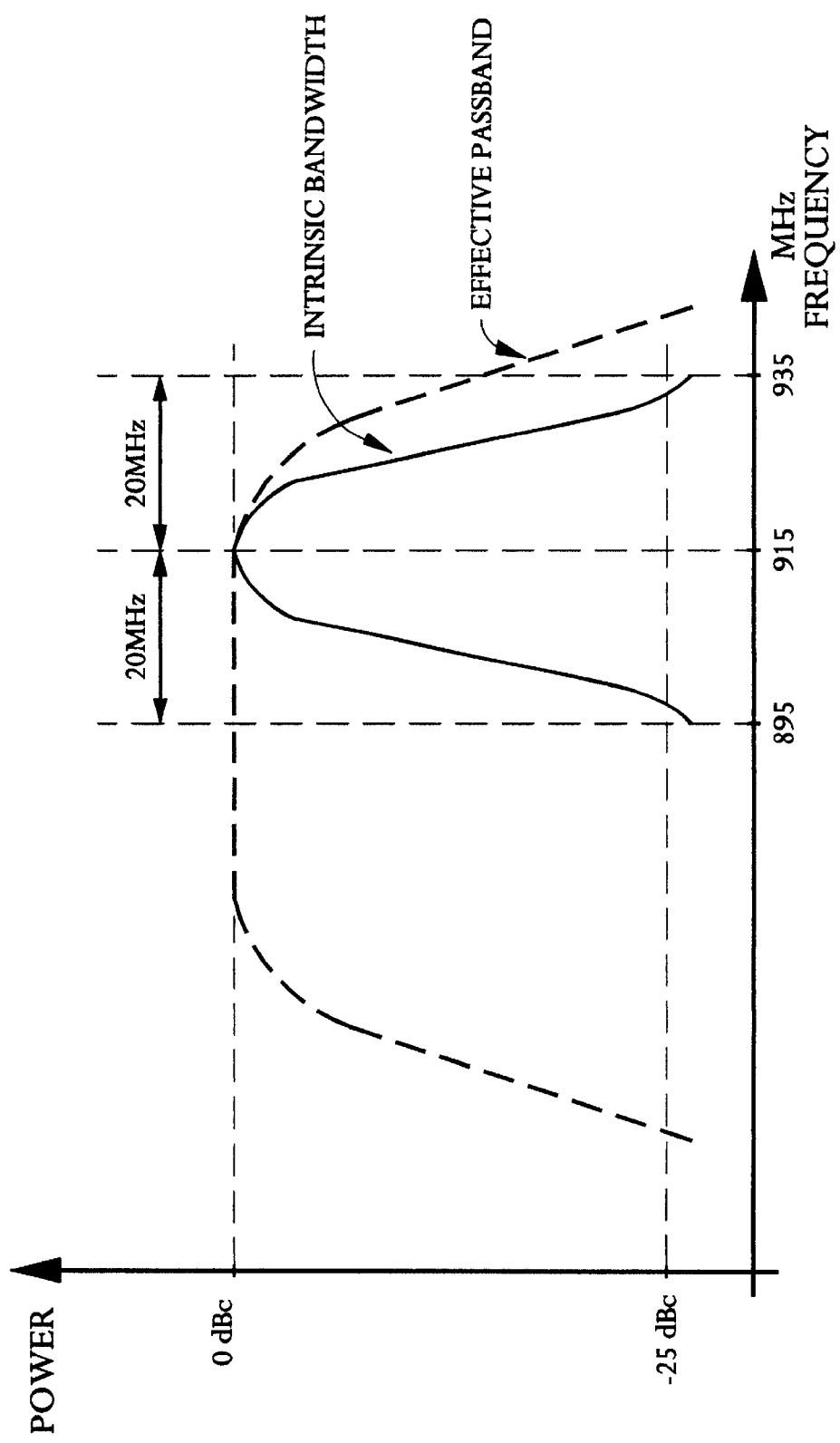
FIG. 2 illustrates the effective passband and the intrinsic bandwidth of the bandpass phase-locked loop tracking filter shown in FIG. 1 according to a preferred embodiment of the present invention.

FIG. 2 illustrates the effective passband of the BPPLL tracking filter 130 shown in FIG. 1. The effective passband is the total frequency range over which the BPPLL tracking filter 130 (shown in FIG. 1) can track the carrier frequency of the RF signal 125 (an exemplary embodiment of which is shown in detail FIG. 1). This is also called the acquisition range of the phase-locked loop 320 (shown in FIG. 3). Due to its narrow and symmetrical intrinsic bandwidth, which is translatable up and down within its effective passband, the BPPLL tracking filter 130 provides the same attenuation in the two sidebands of a signal which occupies a very narrow frequency band, even when this signal frequency band is near one of the two edges of the effective passband of the BPPLL tracking filter 130. In a preferred embodiment, the BPPLL tracking filter 130 provides attenuation in excess of 25 dBc at 935 MHz and 25 dBc at 895 MHz, symmetrical at ±20 MHz from the frequency 915 MHz, as previously described.

For the specific example shown in FIG. 2, the main lobe of the RF signal occupies a frequency band 200 kHz wide located near 915 MHz. Due to the narrow intrinsic bandwidth of the BPPLL tracking filter 130, the sidelobes of the RF signal are attenuated by the same amount in the two stopbands surrounding the main lobe of the RF signal, as desired. For this example, the power of the filtered RF signal is attenuated to −165 dBc per Hz for frequencies equal to or higher than 935 MHz, to 0 dBc at 915 MHz, and −165 dBc per Hz for frequencies equal to or lower than 895 MHz. It is this equal attenuation which causes the equal sidelobes in the stopbands of the spectrum of the signal 135, in turn causing the carrier envelope of the filtered output signal 135 to remain constant, resulting in little or no regrowth of the sidelobes after the signal passes through a power amplifier as discussed before.

Figure 3:
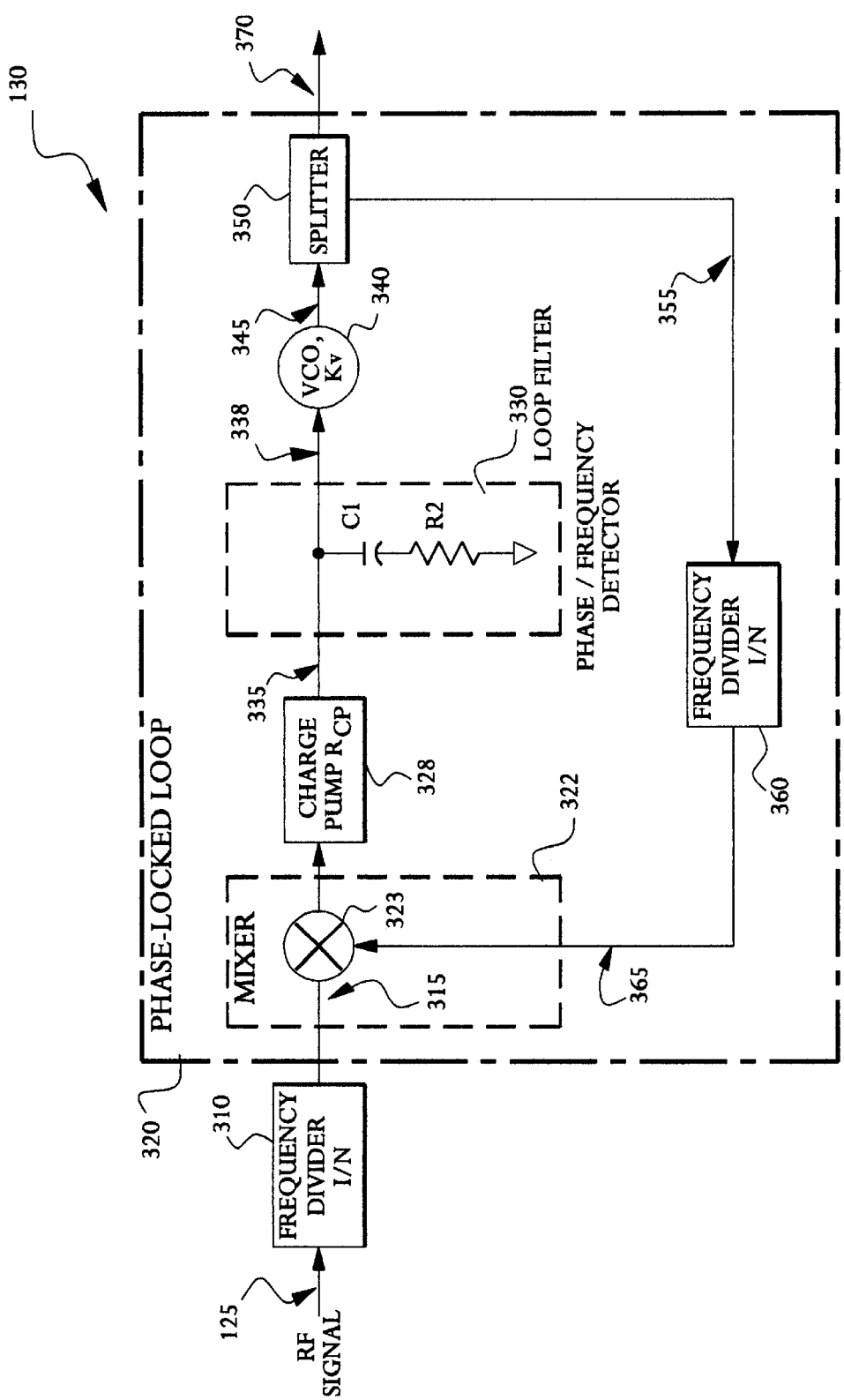
FIG. 3 is a detailed diagram of the bandpass phase-locked loop tracking filter shown in FIG. 1 according to a preferred embodiment of the present invention.

FIG. 3 is a more detailed diagram of the BPPLL tracking filter 130 of FIG. 1. The BPPLL tracking filter 130 comprises a first frequency divider 310 and a phase-locked loop (PLL) 320. The PLL 320 includes a phase/frequency detector 322, a charge pump 328, a loop filter 330, a voltage-controlled oscillator (VCO) 340, a splitter 350, and a second frequency divider 360.

The first frequency divider 310 divides the carrier frequency of the RF signal by an integer number N, where N is greater or equal to 1, to generate a lower frequency signal 315 (assuming N>1) from the RF signal 125. The phase/frequency detector 322 compares the frequency $f_r$ of the signal 315 with the frequency $f_o$ of a feedback signal 365, to produce an error signal 335 to charge pump 328. The charge pump 328 integrates the output of the phase/frequency detector 322 with a gain $K_{CP}$ to provide the signal 335. The loop filter 330 shapes the overall response of the PLL to provide a control signal for the VCO 340, with the output 345 of the VCO being fed back from splitter 350 through the second frequency divider 360 to the phase/frequency detector 322. Since the phase/frequency detector 322 is comparing two signals, both of which have been divided by N, and one of which (the input signal 125) is an RF signal modulated by the digital signals to be transmitted, the output 345 of the VCO, and thus the outputs 350 and 355 of the splitter, will be RF signals also modulated by the digital signals to be transmitted, though conditioned in comparison to the signal 125 by the response of the BPPLL tracking filter 130.

The phase-locked loop 320 has a limited bandwidth. The selection of the bandwidth of the phase-locked loop involves a trade-off between the speed of response and noise in the phase estimate. On one hand, the loop bandwidth is preferably sufficiently wide to track any time variations in the phase of the RF signal 125. On the other hand, a wide bandwidth will allow more noise to pass into the loop, which corrupts the phase estimate. Thus, the bandwidth of the phase-locked loop 320 is preferably narrow, but not too narrow in order for the phase-locked loop to track the RF signal 125.

Thus the BPPLL tracking filter 130, which includes the phase-locked loop 320, filters the RF signal 125 by tracking the RF signal 125 without translating the carrier frequency of the RF signal 125. This filtering function is a bandpass function. Although the intrinsic bandwidth of the BPPLL tracking filter 130, which is the bandwidth of the phase-locked loop 320, is narrow, it is translatable across a large frequency range as the BPPLL tracking filter 130 tracks the RF signal 125. This translatability allows the BPPLL tracking filter 130 to operate over a desired frequency range much larger than its intrinsic bandwidth. For example, for GSM mobile transmissions, the BPPLL tracking filter 130 is capable of tracking the RF signal 125 over the frequency range of 890 MHz to 915 MHz, even though its intrinsic bandwidth is only 200 kHz.

The BPPLL tracking filter 130 acquires the carrier of the RF signal 125 before it filters the RF signal 125. The acquisition time of the BPPLL tracking filter 130 is dependent on the characteristics of the loop filter 330, the frequency division factor N, the frequency difference between the RF frequency and the initial VCO frequency, and the type of the phase/frequency detector 322. For a given phase-locked loop bandwidth, the acquisition time can be reduced by increasing the frequency division factor N. High performance of the phase/frequency detector is needed to reduce acquisition time, especially when the initial frequency offset is much larger than the phase-locked loop bandwidth. For example, under the following conditions in a GSM system, the phase/frequency detector performs much better than an exclusive OR (XOR) detector:

$\omega_n = 2\pi(200 \text{ KHz})$ $\xi = 0.7$ $\omega_{eo} = 2\pi(25 \text{ MHz})$ $N = 1$ (1)

where $\omega_n$ is the loop natural frequency, $\xi$ is the damping factor, and $\omega_{eo}$ is the initial frequency offset.

Under the above conditions (1), the acquisition time $T_P$ for a Type 2 second-order phase-locked loop having an XOR phase detector is:

$$T_P \approx \frac{\omega_{eo}^2}{2\xi \omega_n^3}$$ (2)

$$T_P \approx \frac{(2\pi * 25 * 10^6)^2}{2 * 0.7(2\pi * 200 * 10^3)^3} = 8.9 \text{ ms}$$

Under the conditions (1), the acquisition time for a Type 2 second-order phase-locked loop with a phase/frequency detector is:

$$T_P \approx \frac{\omega_{eo}}{\pi \omega_n^2}$$ (3)

$$T_P \approx \frac{2\pi * 25 * 10^6}{\pi(2\pi * 200 * 10^3)^2} = 0.032 \text{ ms}$$

Thus, under the conditions (1), the acquisition time for a Type 2 second-order phase-locked loop with a phase/frequency detector is about 278 times less than for a Type 2 second-order phase-locked loop with an XOR phase detector.

In the above example, by increasing the frequency division factor (N), the $\omega_{eo}$ term is reduced, which in turn reduces the acquisition time for a given phase-locked loop bandwidth.

The phase-locked loop 320 of FIG. 3 can be a Type 2 second-order phase-locked loop. A design example for a Type 2 second-order phase-locked loop is given in the following discussion. It is noted that the invention is not restricted to this exemplary configuration.

If the open loop transfer function is:

$$G(s) = \frac{1}{s^2 + 2\xi\omega_n s + \omega_n^2}$$ (4)

where $\omega_n$ is the loop natural frequency, and $\xi$ is the damping factor, then the closed loop transfer function is:

$$H(s) = \frac{2\xi\omega_n s + \omega_n^2}{s^2 + 2\xi\omega_n s + \omega_n^2}$$ (5)

This function is a lowpass filter function, which attenuates the modulation sidebands and noise floor relative to the offset from the carrier. However, the VCO phase noise sidebands are not significantly attenuated outside the loop bandwidth, because they are introduced into the loop at a point that produces a highpass filter function. Consequently, the VCO sidebands and noise floor will affect the performance of this BPPLL tracking filter 130 for offsets greater than 20 MHz.

The loop filter 330 comprises a capacitor C1 and a resistor R2. For a Type 2 second-order loop having a charge pump as an integrator, the values of the capacitor C1 and the resistor R2 are as follows:

$$C1 = \frac{K_V K_P K_{CP}}{\omega_n^2}$$ (6)

$R1 = 2\zeta/\omega_n C1$ where $K_V$ denotes the VCO 340 gain, $K_P$ the mixer 323 gain, $K_{CP}$ the charge pump 328 gain, $\omega_n$ the loop natural frequency, and $\zeta$ the damping factor.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for bandpass filtering a radio frequency (RF) signal in a cellular transmit path, the RF signal having a carrier frequency, the method comprising the operations of:

(a) bandpass filtering the RF signal by tracking, without translating, the carrier frequency of the RF signal with a phaselocked loop; and (b) amplifying the filtered RF signal for transmission, wherein the translatable passband of the phase-locked loop is approximately symmetrical with respect to a center frequency.

2. A method for processing an in-phase component and a quadrature component of a signal in a cellular transmit path, the method comprising the operations of:

(a) transforming the in-phase and quadrature components into a modulated radio frequency (RF) signal having a carrier frequency; (b) bandpass filtering the RF signal by tracking, without translating, the carrier frequency of the RF signal with a phase-locked loop; and (c) amplifying the filtered RF signal for transmission, wherein the RF signal has an approximately constant envelope and the filtered RF signal has an envelope approximately identical to the approximately constant envelope.

3. The method of claim 2 wherein operation (a) comprises the operations of:

(a1) transforming the in-phase and quadrature components into an IF signal;

(a2) bandpass filtering the IF signal; and (a3) up-converting the filtered IF signal to provide the radio frequency (RF) signal.

4. The method of claim 3 wherein operation (a1) comprises the operations of:

(a11) modulating a first local oscillator signal with the in-phase component;

(a12) modulating a second local oscillator signal with the quadrature component, the second local oscillator signal being orthogonal to the first local oscillator signal; and (a13) combining the first and second modulated signals to produce the IF signal.

5. A bandpass filter for filtering a radio frequency (RF) signal in a cellular transmit path and providing a filtered RF signal to a power amplifier, the RF signal having a carrier frequency, the bandpass filter comprising a phase-locked loop having a passband for bandpass filtering the RF signal by tracking, without translating, the carrier frequency of the RF signal and generating the filtered RF signal, wherein the RF signal has an approximately constant envelope and the filtered RF signal has an envelope approximately identical to the approximately constant envelope.

6. The bandpass filter of claim 5 wherein the phase-locked loop comprises:

(1) a first frequency divider for dividing the carrier frequency of the RF signal by an integer number N to generate a first signal from the RF signal; (2) a phase/frequency detector coupled to the first frequency divider, the phase/frequency detector receiving the first signal and a feedback signal, and generating a second signal responsive to a difference between the first signal and a feedback signal; (3) a loop filter coupled to the phase/frequency detector to receive the second signal, the loop filter lowpass filtering the second signal to generate a control signal; (4) an oscillator coupled to the loop filter to receive the control signal, the oscillator generating the filtered RF signal in response to the control signal; and (5) a second frequency divider coupled to the oscillator to receive the filtered RF signal, the second frequency divider dividing the frequency of the filtered RF signal by the integer number N to generate the feedback signal.

7. The bandpass filter of claim 6 further comprised of a charge pump coupled between the phase/frequency detector and the loop filter.

8. The bandpass filter of claim 6 wherein the loop filter comprises a capacitor and a resistive element.

9. The bandpass filter of claim 6 wherein the oscillator is a voltage controlled oscillator.

10. The bandpass filter of claim 5 wherein the passband of the phase-locked loop is approximately symmetrical with respect to a center frequency.

11. The bandpass filter of claim 5 wherein the phase-locked loop provides a first attenuation in excess of 25 dB at 895 MHz and a second attenuation in excess of 25 dB at 935 MHz.

12. A system for processing an in-phase component and a quadrature component of a signal in a cellular transmit path, the system comprising:

(a) a modulation system for transforming the in-phase and quadrature components into a radio frequency (RF) signal having a carrier frequency; (b) a bandpass filter coupled to the modulation system, the bandpass filter comprising a phase-locked loop having a bandwidth for bandpass filtering the RF signal by tracking, without translating, the carrier frequency of the RF signal and generating a filtered RF signal; and (c) a power amplifier coupled to the bandpass filter, the power amplifier amplifying the filtered RF signal for transmission, wherein the RF signal has an approximately constant envelope and the filtered RF signal has an envelope approximately identical to the approximately constant envelope.

13. The system of claim 12 wherein the modulation system comprises:

(1) an intermediate frequency (IF) module for transforming the in-phase and quadrature components into an IF signal; (2) a filter coupled to the IF module, the filter bandpass filtering the IF signal and producing a filtered IF signal; and (3) a mixer coupled to the filter, the mixer translating the filtered IF signal to a radio frequency (RF).

14. The system of claim 13 wherein the IF module comprises:

(1) a first mixer for modulating a first local oscillator signal with the in-phase component;

(2) a second mixer for modulating a second local oscillator signal with the quadrature component, the second local oscillator signal being orthogonal to the first local oscillator signal; and (3) an adder for combining the first and second modulated signals to produce the IF signal.

* * * * *